May 26, 1936.  A. J. MOTTLAU  2,041,775
SNAP ACTING DEVICE
Filed Nov. 21, 1930  3 Sheets-Sheet 1

August J. Mottlau,
Inventor,
Delos F. Haynes,
Attorney.

May 26, 1936.  A. J. MOTTLAU  2,041,775
SNAP ACTING DEVICE
Filed Nov. 21, 1930  3 Sheets-Sheet 2

INVENTOR
August J. Mottlau
by J. C. Foster
his attorney

May 26, 1936.  A. J. MOTTLAU  2,041,775
SNAP ACTING DEVICE
Filed Nov. 21, 1930  3 Sheets-Sheet 3

August J. Mottlau,
Inventor,
Delos G. Haynes,
Attorney.

Patented May 26, 1936

2,041,775

UNITED STATES PATENT OFFICE 2,041,775

SNAP ACTING DEVICE

August J. Mottlau, Pittsburgh, Pa., assignor to General Plate Company, Attleboro, Mass., a corporation of Massachusetts Application November 21, 1930, Serial No. 497,239

14 Claims. (Cl. 297—15)

This invention relates to snap-acting devices generally, and, with regard to certain more specific features, to snap-acting thermostatic devices.

Among the several objects of the invention may be noted the provision of a new form of snap-acting device, which, particularly in its thermal-responsive, or thermostatic, embodiment, is adapted to exert a relatively heavier pressure on the object which it controls, such as electric switches, valves, shutters, or the like, up to the actual instant of snapping; the provision of a thermostatic snap-acting device which has an increased sensitivity in its response to temperature variations; the provision of a type of thermostatic snap-acting device which is so formed that it permits of more efficient and advantageous heat-treatment of its material of composition, which is usually the so-called bimetal; the provision of a snap-acting device of the class described which has its positions of stability more effectively stabilized, and its time interval of snapping greatly reduced, over prior analogous devices; and the provision of a snap-acting device of the class described which is relatively simple in construction and operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a perspective view of an unbent plate, forming the actuating element of the present invention;

Figure 3:
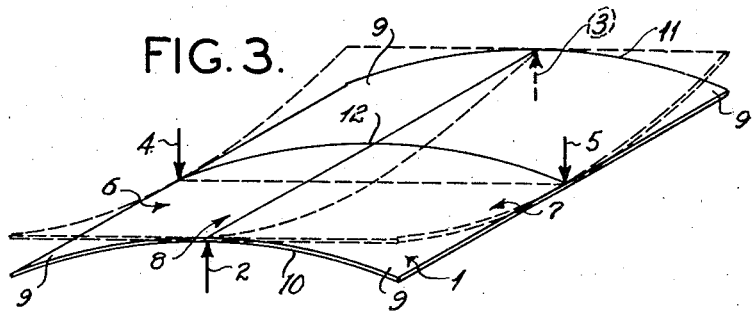
Fig. 3 is a diagrammatic perspective view of the plate of Fig. 1 as conditioned for operation, showing an initial stable position of the plate in solid lines, and an alternative stable position of the plate in dotted lines.
Figure 10:
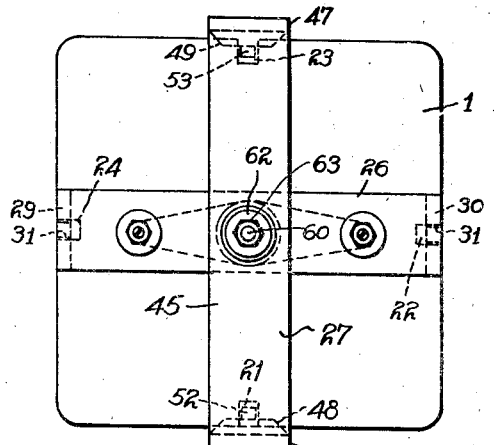
Figure 14:
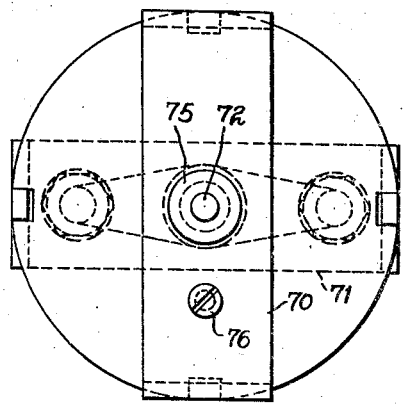
Figure 11:
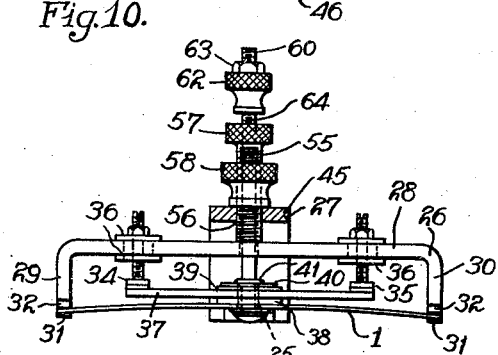
Figure 15:
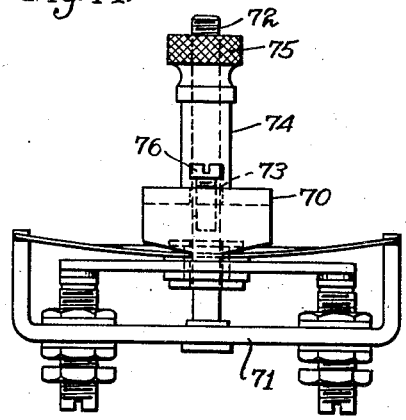
Figure 12:
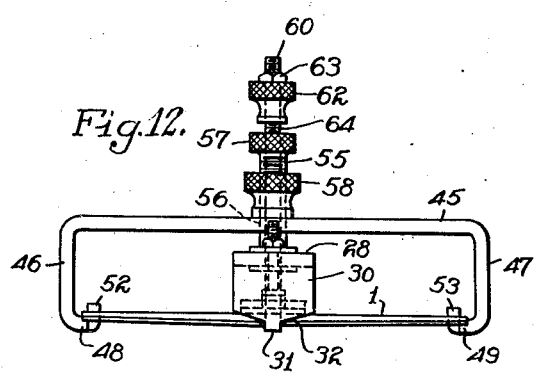
Figure 13:
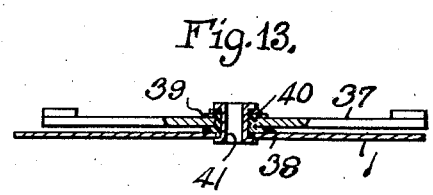
Figure 16:
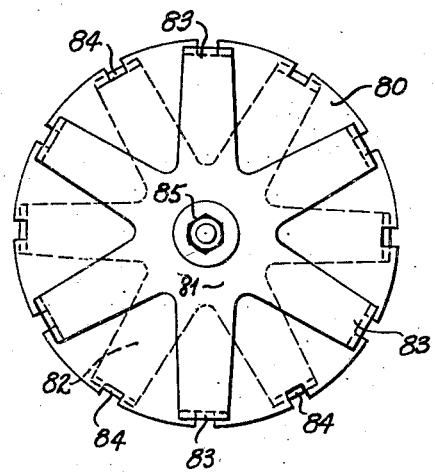
Figure 17:
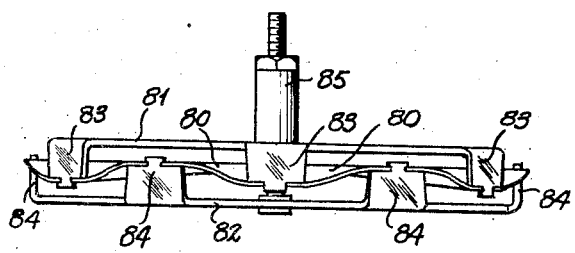
Figure 18:
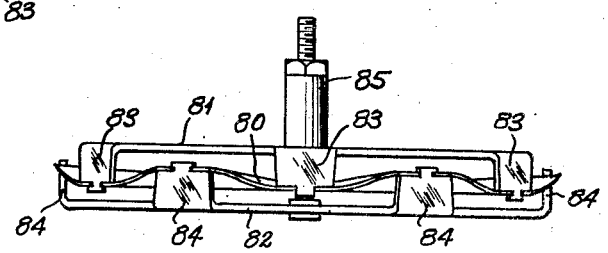
Figure 19:
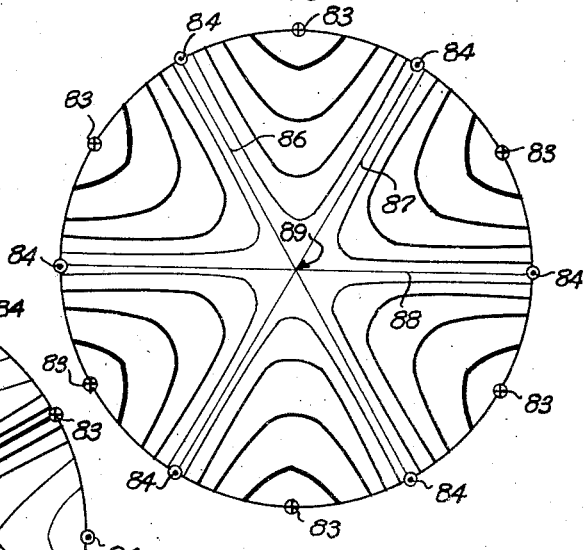
Figure 20:
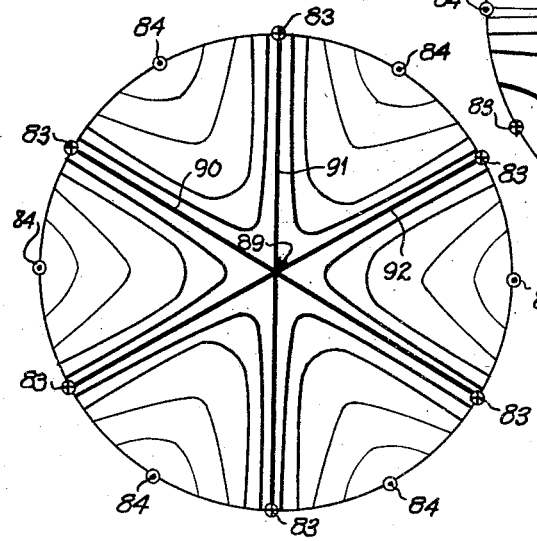

Figures 4 through 9, inclusive, are plan views of the plate of Fig. 3 as it passes from one stable position to another and then back to the first position, the sequence of figures being in the same order as the sequence of positions of the plate, and contour lines being provided to show visually the approximate shape of the plate at each position;

Fig. 10 is a top plan view of an electric switch embodying the present invention;

Fig. 11 is a front elevation of the switch of Fig. 10, partly in section;

Fig. 12 is a side elevation of the switch of Fig. 10;

Fig. 13 is an enlarged fragmentary section taken substantially on line 13—13 of Fig. 10;

Fig. 14 is a top plan view of a second embodiment of electric switch embodying the present invention;

Fig. 15 is a front elevation of the switch of Fig. 14;

Fig. 16 is a top plan view of another embodiment of the invention;

Fig. 17 is an enlarged side elevation of the embodiment of Fig. 16, showing the actuating element in one stable position;

Fig. 18 is a view similar to Fig. 17, but showing the actuating element in its alternative stable position; and, Figures 19 and 20 are diagrammatic plan views of the actuating element of the Fig. 17 embodiment, showing its respective two stable positions, contour lines being used as in the case of Figures 4 through 9.

Similar reference characters indicate corresponding parts throughout the several views of the drawings.

Snap-acting units or elements may be generally classified into those wherein the snap action is a result of the conformation of the element itself, without the necessity of extraneous confining means, such as the snap-acting thermostatic disc shown in John A. Spencer Patent No. 1,448,240, granted March 13, 1923, and those wherein the snap action is a result of the coaction of the element with its mountings, such as the snap-acting thermostatic strip shown in John A. Spencer Patent No. 1,813,776, granted July 7, 1931. The present invention falls into the second class.

While the principal embodiment of the present invention is a temperature responsive device, or thermostat, having snap-acting characteristics, it is to be understood that the invention is not limited to thermostats, but includes snap-acting devices generally. Broadly speaking, the only change that is needed to convert a non-thermostatic snap-acting unit into a thermostatic unit, within the confines of the present invention, is to substitute the ordinary single metal resilient sheet or plate constituting the actuating element with a composite metallic sheet, such as bimetal, which inherently tends to change its shape in response to temperature variations. Thus, in the description of the invention given hereinafter, it will be understood that non-thermostatic as well as thermostatic devices are in contemplation, the difference of material of the actuating element being the only difference noted between these two types.

In the present invention, as applied to a thermostatic unit, the principles of which are disclosed herein, there is provided a bimetallic actuating element or plate in its normal condition, normally flat and free of any pre-shaping, or of any fixed internal stresses established by any pre-shaping. The element is in its normal condition, as stamped out of a large sheet, for example, ordinarily without any permanent deformation that would in any way affect its normal freedom of movement in response to temperature changes. The element is preferably stamped out of a large sheet of heat-treated bimetallic material to the size and shape as it is to be ultimately used. It may be round, square, oval or rectangular in shape. It is necessary merely that the stamping have substantial dimensions in each direction of its area in order that the full advantages of this invention may be enjoyed.

In order that an electric switch, for example, embodying the thermostat of the present invention may have the advantages and desirable characteristics referred to above, namely, sensitivity, a snap action motion of the contact members, substantial pressure of the contact members, and adjustability, both for range and differential, each of which characteristics shall be independent of, and unaffected by, the others, external forces are placed upon the bimetallic member in such manner as to introduce a slight bow or bend relative to one direction or dimension, or along one axis of the member.

In one embodiment of the invention, as disclosed herein, such bending is established by disposing or supporting the bimetallic member at its ends between two spaced end-supports as a beam, and then deflecting or bending the lateral portions or sides of the bimetallic element downwardly, or in a direction opposite to that in which the end-supports press against the bimetallic member.

When the bimetallic member is so bent or shaped between elements impressing two pairs of spaced forces, each pair of which is on opposite surfaces of the bimetallic member, the bimetallic member is provided with a bend or bow conformation with the metal component having the greater co-efficient of thermal expansion in the concave portion of the bow.

In order to insure that the bimetal member shall bow in the proper direction, it may be perforated or otherwise slightly weakened in a certain direction; or the pressure forces may be applied at different distances from the center of the element, to establish a greater bending force in one direction than in the other.

The force-impressing elements may be disposed on opposite sides of the bimetal member or they may be arranged to be on the same side so that one surface of the bimetal member will be entirely exposed.

Figure 1:
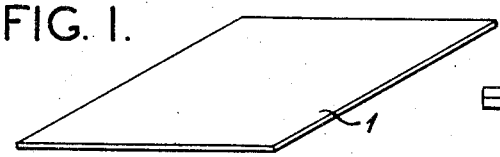
Figure 2:
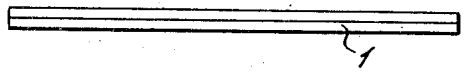
Fig. 2 is an enlarged end elevation of the plate of Fig. 1.

As is illustrated in Figures 1 and 2, the bimetal or composite material which comprises the thermally-responsive actuating element, is a normally flat plate 1, as it might be stamped from a sheet or strip of such material. The plate 1 may be square, rectangular or round in shape, but is illustrated as square in these figures, for the sake of simplicity. Being initially in its normal shape, before assembly in the thermostatic device, the bimetal plate is entirely free of any fixed deformations or internal stresses, and therefore enjoys maximum freedom in adjusting itself to different temperatures to which it may be exposed.

An important advantage that accrues as an incidental to the use of the bimetal plate in its natural normal flat condition, is that an entire sheet or strip of such material may be properly heat-treated at one time, to harden it, and thereby to establish a stronger and livelier actuating element, as was previously explained.

Starting with such a simple normally flat element 1, that is free of any fixed deformation, and consequently, fixed internal stresses, the element 1 is bowed or bent with respect to a line or diameter between two supporting points or fulcrum 2 and 3, by the impression of two forces at points 4 and 5 disposed laterally of the central line or zone between the points 2 and 3 (see Fig. 3). These pressure points or forces are illustrated diagrammatically in these figures by arrows for the sake of simplicity. In the devices that are illustrated in subsequent figures of the drawings, complete thermostats embodying all of the elements necessary therein, including proper pressure and supporting elements, are shown.

Upon reference to Fig. 3, it is apparent that the top forces 4 and 5 deflect the side or lateral portions 6 and 7 of the bimetal plate 1 with respect to a middle zone or portion 8 which we shall consider here for the purposes of this case to be the middle snapping portion, which lies between, and in line with, the two bottom pressure points 2 and 3. Viewing the element as now shaped by the deflection of the wing portions 6 and 7, from the side, the horizon of the plate corresponding to the middle snapping zone 8 is substantially straight and level.

Attention is directed to the fact that the pressure forces on the top and on the bottom surfaces of the plate are substantially perpendicular to the surfaces, at least when initially applied, and are impressed in such manner that the plate is free to move laterally across such force line or with respect to the elements which impress the forces on the plate in the assembled device.

Further consideration of the element in its bow shape, as illustrated in Fig. 3, will show that the middle zone 8 between the two lower pressure forces 2 and 3 may be regarded as a substantially rigid beam between two supports at points 2 and 3. The central portion, or center of the middle zone 8 will be substantially undeflected in the manner normally obtaining in a beam supported between two space supports. The two side wing portions 6 and 7 constitute in effect a truss that supports the center of the middle zone 8 against the normal deflection that might occur if the portion included in the zone 8 were merely a narrow strip supported between the two points designated by forces 2 and 3. The rigidity and force-resisting character established in the zone 8 by reason of the truss construction of the lateral wings 6 and 7 provides the requisite strength or capacity to establish a substantial contact pressure on a controlled element, while at the same time retaining the relative sensitivity and self-adjustability of a normal unshaped element free of fixed deformation and internal stresses.

If the plate 1, after having been bent or shaped, as in Fig. 3, is subjected to increased temperature, the plate will gradually and continuously tend to change shape. At some definite temperature, depending upon the degree of pressure imposed by the two sets of pressure forces 2 and 3, and 4 and 5, the plate will suddenly change shape, with a snap action movement, from the curvature as shown in solid lines in Fig. 3 to that shown in dotted lines. The curvatures are somewhat exaggerated, as illustrated, in order to bring out more clearly the character of the changes in the bimetal member under various conditions. In the dotted-line position or set, the plate 1 is bent or bowed about an axis which is at right-angles to the axis of bending in the solid-line position or set.

The progression of the plate from the solid-line to the dotted-line position is illustrated by Figures 4, 5, 6, and 7. Inasmuch as the intermediate stages are somewhat irregular in shape, the contour-line method of indicating the shape of the plate has been adopted in these figures. A convention whereby the lower contour lines are made heavier than the higher lines has likewise been adopted, for the sake of clarity. That is, the farther away from the eye the contour line is supposed to be, the heavier it is made in the drawings.

Figure 4:
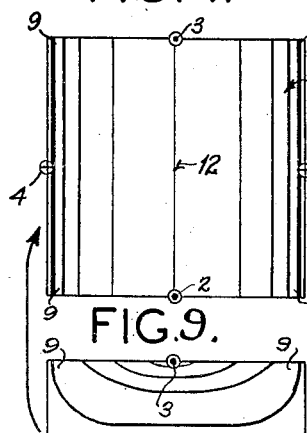
Figure 5:
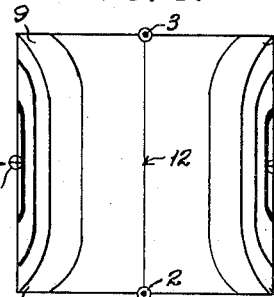

Fig. 4 is the equivalent of the solid-line position of the plate in Fig. 3. The contour lines are parallel and straight, indicating that the plate is bowed to form, roughly, a segment of a cylinder. The bow is about an axis which connects the fulcrum points 2 and 3.

Figure 6:
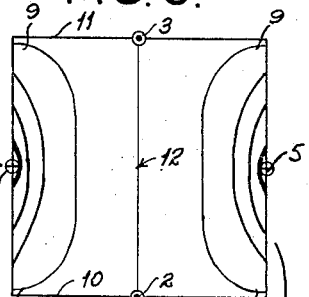

When the temperature increases, the plate 1 exhibits a tendency to curl in the opposite direction, as its bimetallic component having the higher coefficient of expansion is on the under, or concave side of the plate. This tendency is resisted, however, by the trussed beam conformation of the plate 1. As the temperature increases, however, the reverse curl tendency becomes more marked. The four corners 9 of the plate 1, which are unsupported, commence to curl upwardly, thus causing the contour lines to bend to the shape shown in Fig. 5, points 2, 3, 4, and 5, however, remaining in the same position and the axis of the bow remaining unchanged. The corners 9 continue to curl upwardly, as the temperature rises, until the conformation illustrated in Fig. 6 is obtained. Here the corners 9 have curled to the extent that the front and back edges of the plate 1, numbered 10 and 11, respectively, have become substantially straight lines, and in the same plane as the axis joining the fulcrum points 2 and 3. This gradual change of position by the corners has slowly weakened the truss effect, until a final temperature change causes the plate to reverse its curvature to the dotted line position of Fig. 3, or the position indicated in Fig. 7. Here the contour lines are again parallel, but at right angles to the contour lines in Fig. 4. This means that not only has the direction of curvature or bowing of the plate 1 been reversed, but the axis of bowing has changed as well, undergoing a rotation of ninety degrees.

Upon cooling, the plate undergoes a reverse movement, returning to the solid-line position. In so doing, it passes through the conformations indicated in Figures 8 and 9, which, it will be seen, are analogous, in a sense, to the conformations of Figures 5 and 6.

Figure 9:
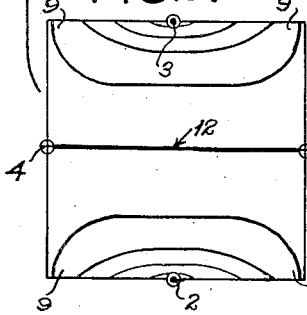
Figure 8:
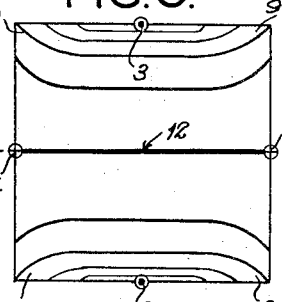
Figure 7:
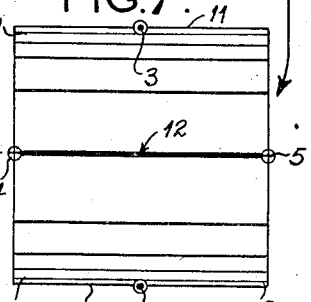

The real "snap" occurs between the Fig. 6 and the Fig. 7 positions on rising temperature, and between the Fig. 9 and the Fig. 4 positions on falling temperature. Pre-snap deformations, illustrated by Figures 5, 6, 8 and 9, are without effect upon a central point 12. Thus, the central point 12 is not moved until the actual snap occurs, and it is this feature which may be said to distinguish the present invention.

In the original solid-line bow, which may be referred to as a physical bow to indicate that it is established physically or by pressure alone, the upper pressure forces 4 and 5 may be considered as the deflecting or depressing forces, around the forces 2 and 3 as fulcrum forces.

When the plate reverses its bow, however, due to the increase in temperature, the two sets of forces change their functions, and the pressure forces 2 and 3, originally fulcrum forces, are now the deflecting forces, while the forces 4 and 5, originally deflecting forces, are now fulcrum forces. By way of simple distinction, the reverse bow which the plate assumes, upon its increase in temperature to a predetermined value, may be referred to as a temperature bow to indicate that such bow is caused by a temperature condition rather than be a purely physical imposition of external forces. Both the "physical" and "temperature" bow positions or sets are positions of relative stability, as contrasted with the fugitive intermediate positions. If the movement of the central point 12 of the plate 1 is considered, it will be seen that the point 12, during the change from the solid to the dotted-line position (or vice versa) moves from the level of the points 2 and 3 to the level of the points 4 and 5. This movement is made use of to effect whatever control it is desired to achieve, such as the position of electrical contact members. Whatever control element is used, it is advisable that it be brought to bear firmly upon the point 12, when the plate is in its solid-line position, as this effectively eliminates creepage to and from the control element as the plate is preparing to snap, if any such creepage is present. The plate, due to its trussed beam conformation, is able to withstand a considerable pressure at the point 12, without being physically forced into its alternative position of stability. Then, when automatic snap action is achieved, due to temperature change, the movement of the control means is sudden and during the course of the snap action. This type of movement of the control is most effective for most control purposes.

The device as thus described may be incorporated into many forms of control devices, such as electric switches, valves, shutters, and the like. Figures 10, 11, 12, and 13, for example, show the device as incorporated into an electric switch.

Referring to these figures, the switch comprises a square plate of bimetal 1 provided with four notches 21, 22, 23 and 24 extending inwardly from the middle of each edge of the plate and having a perforation or opening 25 in the center of the plate.

In order to shape or bow the plate in accordance with the principle disclosed hereinbefore, two pressure elements 26 and 27 are employed, and are disposed at right angles to each other to engage opposite edges of the plate.

The pressure element 26 is of channel or U-shape and embodies a base portion 28 and two sides or arms 29 and 30, respectively. Each of the arms 29 and 30 is provided with a short lug 31 that fits into the slots 22 and 24 of the plate 1. The portions or shoulders 32 of the arms 29 and 30 adjacent and directly behind the lug 31 are inclined or tapered backwardly from the tip to permit relative freedom of the plate in the region adjacent the lug 31.

The cross bracket 26 serves further as a support for two contact members 34 and 35, adjustably mounted thereon and properly insulated therefrom by suitable insulating means such as insulating washer assemblies 36. The contact members 34 and 35 are adapted to be connected to an external circuit which the thermostat is to control, and the circuit between the two contact members is established or broken by a bridging contact member 37 mounted on but insulated from the thermal plate 1. As illustrated in Fig. 13, the bridging contact member 37 is spaced from the plate 1 by an insulating washer 38. A similar insulating washer 39 is disposed on top of the bridging contact member 37 and a small metal washer 40 rests upon the top insulating washer. The bridging member 37 is secured in position to the plate 1 by a hollow metallic rivet 41, as illustrated, shaped to prevent turning of the bridging contact member on the plate.

The upper cross bracket 27 is also of channel or U-shape and embodies a main base portion 45, two side arms 46 and 47 extending down past the side edges of the plate 1 and bent inwardly and then upwardly in substantially J-form to provide two seats or rests 48 and 49 for the edges of the plate. The seats 48 and 49 embody upwardly extending lugs 52 and 53 positioned in the slots 21 and 23, of the plate, respectively.

On referring to Figures 11 and 12 it will be apparent that when the two brackets 26 and 27 are moved apart or separated, the arms of the two brackets will establish the pressure forces illustrated in Fig. 3.

Any suitable means may be provided to separate the two brackets, but in the present device there is provided a hollow threaded tubular member 55 that is adjustably disposed in a threaded opening 56 in the base portion 45 of the bracket 27, and is provided with a knurled actuating portion 57. The lower end of the adjustable tubular member 55 abuts against the main base portion 28 of the lower bracket 26 and serves, when adjustably rotated, to vary the spacing between the brackets 26 and 27, and, thereby, to vary the amount of bow or bend in the plate 1.

After the two cross brackets have been suitably adjusted to establish the proper tension in the plate 1, a lock nut 58 is tightened into position to prevent casual or accidental displacement of the adjustment. The lock nut 58 is threadably mounted on the threaded cylinder 55 and is adapted to engage and abut against the top surface of the main base portion 45 of the bracket 27.

When the device is so adjusted, the plate will be bent or bowed and the bridging contact member 37 will be caused to engage the contact members 34 and 35 with a certain amount of pressure which will establish the condition hereinbefore described. When the plate is subjected to the proper temperature, corresponding to the setting for which it is adjusted, it will change shape and snap over into a reverse bow in the manner described and explained.

In order to provide a limiting stop to establish a back pressure, and thus to aid the reverse snap of the plate 1, a threaded pin or bolt 60 is extended through the hollow rivet 41, an opening 61 in the cross bracket 26, and the hollow adjusting member 55, all of which are in alignment. An adjustment screw 62 with a locking nut 63, both of which are threadably disposed on the pin or bolt 60, determines the spacing or distance 64 between the top of the lock nut 57 and the bottom of the adjusting screw 62, which corresponds to the space or distance through which the center of the plate 1 will be permitted to move when it snaps or tends to snap to its reverse bow position. The bolt 60 is provided with a suitable head 25 and a short square shank section adjacent the head to prevent its turning in the square hollow rivet 41.

The spacing of the washer 38 between the plate and the bridging member permits the plate to have freedom of movement at its center as it changes shape in bowing from one side to the other.

By means of the arrangement illustrated herein all of the necessary adjustments are made upon one adjusting post. By means of these adjustments, both the temperature at which the device shall operate and the differential within which it shall operate may be easily adjusted.

A further advantage of a device of this design is that the entire sensitive surface of the thermostat may be directly exposed to the temperature to which it is to be subjected or it may be very closely located adjacent a surface whose temperature the thermostatic device is to regulate, as, for example, the sole plate of a sad iron.

Another form of device embodying the principles of this invention is illustrated in Figures 14 and 15, which illustrate a device in which a round disc or plate is employed and in which the brackets are disposed on opposite sides of the plate. The top bracket 70 in these figures correspond to the pressure bracket 26 in Fig. 12 and the lower bracket 71 corresponds to the fulcrum or supporting bracket 27 in Fig. 12. In this device, since the brackets are disposed on opposite sides of the plate, the brackets are pressed closer together, instead of being separated, in order to establish the proper bending forces on the plate.

To impress such pressure forces upon the two brackets, a threaded pin 72 is anchored, at one end, in the lower bracket 71 and extends through a central opening 73 in the upper bracket 70 as well as through the center of the plate and bridging contact assembly, which is substantially the same as illustrated in Figures 12 and 13 of the other device. A short hollow cylindrical tube 74 rests against the top surface of the bracket 70 and freely encircles the pin 72. An adjusting nut 75 on the pin 72 rests against the cylinder 74 and by adjustment of the position of the nut 75 on the pin, the compression pressure upon the two brackets 70 and 71 may be varied to establish the desired bending stress in the plate.

In order to limit the backward movement of the plate, when it tends to change its shape and reverse its bow, an adjustable back stop 76 is provided and mounted on the top bracket 70, in a manner similar to the disposition of the stationary contact members on the lower bracket.

The co-operation between the contact members and the bridging member as controlled by the plate is similar to that already explained in connection with the other device shown in Figures 10, 11, and 12.

For relatively high temperatures, such as encountered in electric flat irons, any of the suitable high temperature bimetal elements may be employed. In the device illustrated the plate consists of monel-invar bimetal about one inch and a quarter in diameter and about 18 mils thick.

In all of the embodiments thus far described, the plate has been subjected to only four forces, alternating in direction about its periphery. The invention is not so limited. For example, in Figures 16, 17, 18, 19, and 20 is shown an embodiment of the invention in which twelve forces are disposed in alternating direction about the periphery of a circular plate or disc 80 initially flat in nature. The forces are applied, six on each side of the disc 80, by a pair of elements 81 and 82 having depending fingers 83 and upstanding fingers 84, respectively. The elements 81 and 82 are connected by a central column 85, as in the Fig. 15 embodiment.

The fingers 83 and 84 force the periphery of the disc 80 into a wave form, as shown in Fig. 17. Fig. 19 shows the shape of the disc 80 under such conditions, the conventions for Fig. 19 (and Fig. 20) being the same as in the case of Figures 4 through 9. It will be seen that the bending of the disc is about three intersecting axes indicated by the contour lines numbered 86, 87, and 88, each line resembling the trussed beam conformation of the earlier embodiments. The central point 89 of the disc 80 remains at the level of the lines 86, 87, and 88, and the fingers 84.

The alternate stable position of the disc 80 is shown in Figures 18 and 20. Here the bending axes, now indicated by the numerals 90, 91, and 92, connect the fingers 83 instead of the fingers 84. In other words, the fingers 84, in the first stable position, are fulcrums, while the fingers 83 are depressing forces, while in the second stable position, the fingers 83 are the fulcrums and the fingers 84 are the depressing forces. In the second stable position, the central point 89 is at the level of the fingers 83, and thus its snapping movement (available for control purposes) is between the levels of the fingers 83 and 84. The axes of bending may, in this embodiment, be considered as shifting through an angle of thirty degrees with the snap movement.

Thus, it will be seen, the invention is not limited in the number of forces that need be applied at the periphery of the actuating element, provided such forces are present in multiples of four. Four is also the minimum number of forces which will make an operative device. Also, it is requisite that the number of forces in one direction equal the number in the other direction, so that they may alternate in regularity about the periphery of the plate.

The positions of the Fig. 16 embodiment intermediate to its two stable positions are too complicated to permit of ready analysis, hence they are not given herein.

In all of the several modifications presented herein, the extent to which the plate is bent or flexed between the pressure and supporting elements determines the operating temperature of the device as well as its differential.

By means of the constructions illustrated herein, the advantages particularly desired in thermostatic devices are rendered available, namely, relative sensitivity, heavy contact pressure until the instance of break, snap action separation and engagement of the contact members, and adjustment both of range and operating temperature. Because the thermostatic embodiments of the devices described herein employ bimetal elements in their normal condition they can be heat-treated to a much higher temperature than pre-shaped elements and therefore can be made stronger and more durable. Moreover, since the devices described herein are susceptible of adjustment, it is not essential that extremely accurately made bimetal be employed, which is an element of considerable expense when such accurately made metal must be utilized. The present devices permit the use of inexpensive metal and thus contribute further to the economic manufacture of such device.

It is contemplated that any composite metal embodying two or more elements having different coefficients of expansion, may be utilized as the actuating plate as well as the composite integral material commonly referred to as bimetal.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim as my invention:

1. A snap-acting device comprising a resilient plate, at least four force-applying members disposed about the periphery of said plate, two of said members applying forces to said plate at diametrically opposite points thereon in one direction, and the other two of said members applying forces to said plate at diametrically opposite points thereon, intermediate said first two members, in the opposite direction, whereby said plate is bowed, said force-applying members being adapted to apply such forces that the plate has two positions of relative stability, in one of which positions the first two members act as fulcrums and the second two members act as depressing forces, and in the other of which positions the first two members act as depressing forces and the second two members act as fulcrums, the said plate passing from one of said positions to the other with a snap action.

2. A snap-acting device comprising a resilient plate, means constraining said plate into a bowed configuration, said constraining means being so arranged that the said plate has two positions of relative stability, in one of which it is bowed about one axis, and in the other of which it is bowed in an opposite direction about an axis at an angle to the first axis, said plate passing from one of said positions to the other with a snap action.

3. A snap-acting device comprising a resilient plate, force-applying means disposed about the periphery of said plate, said means being present to the extent of four or multiples thereof, said means applying forces to said plate in alternating directions normal to the periphery thereof, whereby said plate is distorted from its normal shape, the distortion being such that said plate has two shapes of relative stability, in one of which shapes all forces acting in one direction constitute fulcrums, and all forces in the opposite direction constitute depressing forces, while in the second of which shapes, the forces acting in the first direction constitute depressing forces, while the forces acting in the second direction constitute fulcrums, the plate passing between said two shapes with a snap action.

4. A snap-acting device comprising a resilient plate, a pair of force-applying members in one plane disposed to act upon the plate in one direction at diametrically opposite points thereon, and a second pair of force-applying members in a plane substantially at right-angles to said first plane disposed to act upon the plate in an opposite direction at diametrically opposite points thereon, whereby said plate is bowed about an axis connecting one of said pairs of members, said plate being thereby adapted to snap to a position of opposite bowing about an axis connecting the other pair of members.

5. A snap-acting device comprising a resilient plate, means forcing said plate into a conformation analogous to a trussed beam, said means being so constituted as to cause said plate to snap from said trussed beam confirmation into a second trussed beam conformation, the second conformation being in the opposite direction and along an axis substantially at right angles to the axis of the first conformation.

6. A snap-acting thermostat comprising a composite metal plate, at least four force-applying members disposed about the periphery of said plate, two of said members applying forces to said plate at diametrically opposite points thereon in one direction, and the other two of said members applying forces to said plate at diametrically opposite points thereon, intermediate said first two members, in the opposite direction, whereby said plate is bowed, said force-applying members being adapted to apply such forces that the plate has two positions of relative stability, in one of which positions the first two members act as fulcrums and the second two members act as depressing forces, and in the other of which positions the first two members act as depressing forces and the second two members act as fulcrums, the said plate passing from one of said positions to the other with a snap action, in response to temperature variations.

7. A snap-acting thermostat comprising a composite metal plate, means constraining said plate into a bowed configuration, said constraining means being so arranged that the said plate has two positions of relative stability, in one of which it is bowed about one axis, and in the other of which it is bowed in an opposite direction about an axis at an angle to the first axis, said plate passing from one of said positions to the other with a snap action, in response to temperature variations.

8. A snap-acting thermostat comprising a composite metal plate, force-applying means disposed about the periphery of said plate, said means being present to the extent of four or multiples thereof, said means applying forces to said plate in alternating directions normal to the periphery thereof, whereby said plate is distorted from its normal shape, the distortion being such that said plate has two shapes of relative stability, in one of which shapes all forces acting in one direction constitute fulcrums, and all forces in the opposite direction constitute depressing forces, while in the second of which shapes, the forces acting in the first direction constitute depressing forces, while the forces acting in the second direction constitute fulcrums, the plate passing between said two shapes with a snap action, in response to temperature variations.

9. A snap-acting thermostat comprising a composite metal plate, a pair or force-applying members in one plane disposed to act upon the plate in one direction at diametrically opposite points thereon, and a second pair of force-applying members in a plane substantially at right-angles to said first plane disposed to act upon the plate in an opposite direction at diametrically opposite points thereon, whereby said plate is bowed about an axis connecting one of said pairs of members, said plate being thereby adapted to snap to a position of opposite bowing about an axis connecting the other pair of members, in response to temperature variations.

10. A snap-acting thermostat comprising a composite metal plate, means forcing said plate into a conformation analogous to a trussed beam said means being so constituted as to cause said plate, in response to temperature variations, to snap from said first conformation into a second trussed beam conformation, the second conformation being in the opposite direction and along an axis substantially at right angles to the axis of the first conformation.

11. A thermostatic control comprising a composite metal plate, force-applying means disposed about the periphery of said plate, said means being present to the extent of four or multiples thereof, said means applying forces to said plate in alternating directions normal to the periphery thereof, whereby said plate is distorted from its normal shape, the distortion being such that said plate has two shapes of relative stability, in one of which shapes all forces acting in one direction constitute fulcrums, and all forces in the opposite direction constitute depressing forces, while in the second of which shapes, the forces acting in the first direction constitute depressing forces, while the forces acting in the second direction constitute fulcrums, the plate passing between said two shapes with a snap action, in response to temperature variations, and means for effecting a control attached to the center of said plate and movable therewith.

12. A thermostatic control comprising a composite metal plate, a pair or force-applying members in one plane disposed to act upon the plate in one direction at diametrically opposite points thereon, and a second pair of force applying members in a plane substantially at right-angles to said first plane disposed to act upon the plate in an opposite direction at diametrically opposite points thereon, whereby said plate is bowed about an axis connecting one of said pairs of members, said plate being thereby adapted to snap to a position of opposite bowing about an axis connecting the other pair of members, in response to temperature variations, and means for effecting a control attached to the center of said plate and movable therewith.

13. In a device of the character described, a resilient member having a stable set along each of a number of intersecting axes, means engaging the edges of the member adjacent the said one axis, to control the set along that axis, and an abutment for the member against which said means can act.

14. In a device of the character described, a resilient member having a stable set along each of a pair of transverse axes, means for controlling the set along one of said axes, said means engaging the edges of the member adjacent said axis, and an abutment for engaging the member intermediate said edges, whereby movement of said controlling means in one direction will urge the member toward the abutment.

AUGUST J. MOTTLAU.